United States Patent [19]
Muthiah et al.

[11] Patent Number: 6,048,949
[45] Date of Patent: *Apr. 11, 2000

[54] UNSATURATED POLYESTER POWDER COATINGS WITH IMPROVED SURFACE CURE

[75] Inventors: Jeno Muthiah, Wernersville; Joseph J. Kozlowski, Reading; Navin B. Shah, Sinking Spring; Paul H. Radcliffe, Robesonia; Edward G. Nicholl, Reading, all of Pa.

[73] Assignee: Morton International, Inc., Chicago, Ill.

[*] Notice: This patent is subject to a terminal disclaimer.

[21] Appl. No.: 09/075,978

[22] Filed: May 11, 1998

[51] Int. Cl.⁷ ....................................... C08F 20/00
[52] U.S. Cl. .................. 525/438; 525/448; 525/934; 528/272
[58] Field of Search .................. 525/438, 448, 525/934; 528/272

[56] References Cited

U.S. PATENT DOCUMENTS

| | | | |
|---|---|---|---|
| 4,001,153 | 1/1977 | Ogino et al. | 260/22 CB |
| 4,511,629 | 4/1985 | Konno et al. | 428/522 |
| 4,777,213 | 10/1988 | Kanda et al. | 525/114 |
| 4,980,113 | 12/1990 | Cummings | 264/255 |
| 5,168,110 | 12/1992 | Van Den Elshout et al. | 525/438 |
| 5,183,856 | 2/1993 | Kitagawa et al. | 525/282 |
| 5,321,100 | 6/1994 | Belder et al. | 525/438 |
| 5,326,832 | 7/1994 | Belder et al. | 525/438 |
| 5,684,067 | 11/1997 | Muthiah et al. | 523/453 |

FOREIGN PATENT DOCUMENTS

| | | |
|---|---|---|
| 0636669 | 2/1995 | European Pat. Off. . |
| WO9319132 | 9/1993 | WIPO . |

OTHER PUBLICATIONS

C.H. Hare, *Polyester Resins*, Paint India, Mar. 1996, pp. 41–48.

*Primary Examiner*—Terressa M. Boykin
*Attorney, Agent, or Firm*—Steven C. Benjamin; Gerald K. White

[57] ABSTRACT

Low temperature curable unsaturated polyester powder coatings suited for heat sensitive substrates with improved surface cure through incorporation of active hydrogen groups into the unsaturated polyester molecule. The unsaturated polyesters containing active hydrogens are derived from ethylenically unsaturated polyfunctional carboxylic acids and active hydrogen containing polyols. Full cure on the surface is obtained without the need for polyethylene waxes or oxygen-reactive curative resins that are commonly employed in order to prevent atmospheric oxygen from inhibiting the free-radical induced cure at the surface of the coating.

17 Claims, No Drawings

UNSATURATED POLYESTER POWDER COATINGS WITH IMPROVED SURFACE CURE

FIELD OF THE INVENTION

This invention relates to low temperature curable powder coatings based on unsaturated polyester resins suited for heat sensitive substrates. More particularly, this invention relates to such powder coatings in which active hydrogen groups are introduced into the unsaturated polyester resin, to prevent atmospheric oxygen from inhibiting the cure at the surface of the coating film formed therefrom.

BACKGROUND OF THE INVENTION

Thermosetting powder coatings have gained considerable popularity in recent years over liquid coatings for a number of reasons. Powder coatings are virtually free of harmful fugitive organic solvents normally present in liquid coatings, and, as a result, give off little, if any, volatiles to the environment when cured. This eliminates solvent emission problems and dangers to the health of workers employed in the coating operations. Powder coatings also improve working hygiene, since they are in dry solid form with no messy liquids associated with them to adhere to workers' clothes and coating equipment. Furthermore, they are easily swept up in the event of a spill without requiring special cleaning and spill containment supplies. Another advantage is that they are 100% recyclable. Over sprayed powders are normally recycled during the coating operation and recombined with the original powder feed. This leads to very high coating efficiencies and minimal waste generation.

However, in spite of the many advantages, powder coatings traditionally have not been suited for heat sensitive substrates, such as wood and plastic articles, due to the rather high temperatures demanded to fuse and cure the powders. Recent efforts have focused on the development of powder coatings which permit polymerization or curing at lower temperatures, in order to reduce the amount of potentially damaging and deforming heat loads imposed on sensitive substrates.

Low temperature curable powder coatings based on epoxy resins have recently been proposed, as for example, as taught in U.S. Pat. No. 5,714,206. However, curing agents used to achieve the low temperature cures are based on aliphatic or aromatic amines which tend to yellow under heat. Also, epoxy coatings generally do not provide the durability and weatherability that unsaturated polyester based powder coatings normally provide.

Unsaturated polyester powder coatings are both weatherable and extremely reactive systems that undergo rapid polymerization at low temperatures, making them particularly attractive for coating heat sensitive substrates. However, one drawback with their use is that the free radical-induced polymerization or curing reaction is easily inhibited along the surface of the coating upon contact with air or, more precisely, oxygen. Atmospheric oxygen, which contacts only the surface of the coating film, while leaving the interior unaffected, adds to the terminal free radical generated on the growing addition polymer and caps it, thereby halting further polymerization and leaving the surface of the coating film uncured. The surface, therefore, remains soft and tacky and possesses inferior film properties, such as poor solvent resistance, stain resistance, and surface hardness.

Various approaches have been taken to minimize surface air inhibition. For instance, attempts have been made to incorporate polyethylene waxes in the unsaturated polyester powder formulations to provide an oxygen barrier layer on the film's surface which is eventually polished off after curing. This approach works well with liquid coatings. However, in powder coatings, the rapid curing at low temperatures does not allow the wax enough time to diffuse and rise to the surface of the film. Higher wax loadings may be used, but this tends to cause the powders to block or sinter during storage and/or to produce an aesthetically unfavorable orange peel finish when cured.

Another approach has been to incorporate oxygen-reactive species in the coatings, as for example, as taught in International (PCT) Publication WO 93/19132. Therein disclosed are low temperature curable unsaturated polyester powder coatings with a resin system composed of a mixture of unsaturated polyester resins and allyl ether curatives that is cured in the presence of free radical peroxide initiators and cobalt salt catalysts. Air inhibition is prevented by employing oxygen-reactive allyl ether curatives which consume oxygen before it can interfere with the curing reaction. However, one disadvantage of such powders is that the curatives used to get good surface cure are mostly liquids or waxy (low melting) semi-solids at room temperature. Liquid and semi-solid materials have only limited use in powder coatings. Typically, when employed beyond a few percent, they tend to cause the powders to block or sinter in storage, giving the powders poor shelf stability and making them difficult to meter and spray during coating operations. Conversion of such materials into solids is expensive and time-consuming. Another disadvantage is that the production of these low temperature curable powders is extremely difficult, since they have a tendency to pre-react and set-up in the extruder during the traditional melt-mixing process.

It would be desirable and is, therefore, a primary object of the invention to provide a melt extrudable low temperature curable unsaturated polyester powder coating suited for heat sensitive substrates that exhibits excellent surface cure without the need for waxes or oxygen-reactive curatives.

SUMMARY OF THE INVENTION

In accordance with the present invention, a melt extrudable low temperature curable powder coating composition suited for heat sensitive substrates is provided which comprises a film-forming particulate blend of: A) an unsaturated polyester resin, preferably an unsaturated polyester based on maleate or fumarate unsaturation, in which the resin contains one or more active hydrogens per molecule; B) a free radical cure initiator; and, C) a redox catalyst. The unsaturated polyester resin A) is preferably derived from an ethylenically unsaturated polyfunctional carboxylic acid (or its anhydride), such as maleic anhydride or fumaric acid, and a polyol containing one or more active hydrogen atoms (active methylene or methine groups) in the molecule. The unsaturated polyester resin A) so formed exhibits a diminished amount of air inhibition, which allows the surface to cure satisfactorily without the need for waxes or oxygen-reactive curatives.

The present invention also provides a method for improving the surface cure of low temperature curable unsaturated polyester powder coatings by incorporating therein unsaturated polyester resins of the aforesaid character, a method for coating heat sensitive substrates with powder coatings of the aforesaid character without damaging the substrate, and heat sensitive articles, such wood or plastic articles, having coated and cured thereon powder coatings of the aforesaid character.

DETAILED DESCRIPTION OF THE PREFERRED EMBODIMENTS

Throughout this specification, all parts and percentages specified herein are by weight unless otherwise stated. Herein, the "resin" is considered to be resin A) plus, if any, resin D). Levels of other components are given as parts per hundred parts of the resin (phr).

Unsaturated polyester resins A) useful in the present invention contain at least one ethylenic unsaturation site and at least one active hydrogen site per molecule. The term "active hydrogen" used herein means a hydrogen atom that is readily abstracted by free radicals and participates in the curing reaction.

The unsaturated polyester resins A) are prepared in a conventional manner by the condensation of one or more ethylenically unsaturated polyfunctional carboxylic acids (or their anhydrides) having carboxyl functionalities of 2 or greater with one or more active hydrogen containing polyols having hydroxyl functionalities of 2 or greater. Although the active hydrogen in the unsaturated polyester resin A) is typically supplied by the polyol, it may instead come from active hydrogen containing acids employed in conjunction with the unsaturated acid.

In addition, while the ethylenic unsaturation is typically supplied by the acid, it is possible to supply it instead through the polyol. The ethylenic unsaturation may be provided in the polymer backbone or at the end of the chain. If it is supplied at the chain end, ethylenically unsaturated monocarboxylic acids (or their esters) are also employed in the condensation reaction. Furthermore, the unsaturated polyesters may be carboxyl- or hydroxyl-terminated depending upon the monomer mixture ratio. While these saturated reactivities generally do not participate in the curing reaction which proceeds primarily through the unsaturated groups, they are often used to achieve desired chemical and mechanical properties in the final polymer.

Examples of suitable ethylenically unsaturated polyfunctional carboxylic acids (or their anhydrides) include maleic anhydride, fumaric acid, itaconic anhydride, tetrahydrophthalic anhydride, nadic anhydride, dimeric methacrylic acid, etc. Maleic anhydride, fumaric acid, or their mixtures are generally preferred because of economic considerations. It should be understood that whether acids or anhydrides are listed, any of these forms are contemplated for use herein.

Examples of suitable monofunctional acids for chain end unsaturation include acrylic acid, methacrylic acid, etc.

Often, saturated and aromatic polyfunctional carboxylic acids (or their anhydrides) are employed in conjunction with the unsaturated acids to reduce the density of the ethylenic unsaturation and provide desired chemical and mechanical properties. Examples of suitable saturated and aromatic polyfunctional acids (or anhydrides thereof) include adipic acid, succinic acid, sebacic acid, phthalic anhydride, isophthalic acid, terephthalic acid, dimethylterephthalate, dimethylisophthalate, tetrahydrophthalic acid, hexahydrophthalic acid, cyclohexane dicarboxylic acid, dodecane dicarboxylic acid, trimellitic acid, pyromellitic anhydride, etc.

The polyols with active hydrogens include polyols that contain at least one active methylene group or active methine group per molecule. If the active hydrogens are supplied by active methylene groups, the polyols may contain an active hydrogen atom attached to an allylic carbon or benzylic carbon, if the active hydrogens are supplied by active methine groups, the polyols may contain an active hydrogen atom attached to a cyclohexyl or tertiary alkyl carbon. Allylic, benzylic, cyclohexyl, and tertiary alkyl hydrogen atoms are readily abstracted during free radical-induced curing to form the corresponding stable allylic, benzylic, cyclohexyl, and tertiary alkyl free radicals, all of which promote curing at the surface of the coating film in an open air atmosphere.

Examples of suitable polyols having an allylic hydrogen include trimethylol propane monoallyl ether, trimethyol propane diallyl ether, vinyl cyclohexanediol, etc. Examples of suitable polyols having a benzylic hydrogen include benzene dimethanol, etc. Examples of suitable polyols having a cyclohexyl hydrogen include cyclohexane dimethanol, cyclohexane diol, etc. Examples of suitable polyols having a tertiary alkyl hydrogen atom include methyl propanediol, butylethyl propanediol, etc.

As mentioned above, it is also possible to supply the active hydrogen through the carboxylic acid. Examples of suitable polyfunctional carboxylic acids with active hydrogens (active methylene groups) include carboxylic acids that include a malonyl hydrogen, such as malonic acid, etc., or an allylic hydrogen, such as nadic anhydride, tetrahydrophthalic anhydride, dimer acid, etc.

Often, polyols without active hydrogens are employed in the condensation reaction in conjunction with the active hydrogen containing polyols to provide desired chemical and mechanical properties. Examples of suitable polyols without active hydrogens include ethylene glycol, diethylene glycol, triethylene glycol, propylene glycol, neopentyl glycol, butanediol, dodecanediol, hydrogenated bisphenol A, bisphenol A/propylene oxide adducts, glycerol, trimethylolpropane, trimethylolethane, etc.

In accordance with this invention, it is preferred that between about 10 and 100 mole %, and even more preferred that between about 50 and 100 mole %, of the hydroxyl functionality relative to the total hydroxyl functionality of monomers used to form the unsaturated polyester resin A) is provided by active hydrogen containing polyol monomers.

The unsaturated polyester resin A) can be formulated to have either a crystalline or amorphous microstructure. Crystalline resins or blends of crystalline and amorphous resins are desirable for forming powder coatings with lower melt viscosity and better flow out behavior. It is well known in the art that certain alcohol and acid monomers impart crystallinity to the unsaturated polyesters. For example, symmetrically substituted linear monomers or cyclic monomers or their mixtures are generally used to form crystalline polyesters. Examples of suitable diols that are known to promote crystallinity include ethylene glycol, butanediol, hexanediol, and cyclohexanedimethanol. Examples of suitable dicarboxylic acids that are known to do the same include terephthalic acid, adipic acid, dodecane dicarboxylic acid, and cyclohexane dicarboxylic acid.

Blends of amorphous resins with active hydrogens and crystalline resins without active hydrogens or visa versa may be used to further improve flow characteristics of the powder coatings.

The unsaturated polyester resins most useful herein are solid materials at room temperature, so that they can be easily formulated into non-blocking powders. Preferably, the polyester resins also remain solid during normal storage and exhibit virtually no cold flow at temperatures up to about 90° F. The preferred resins further have a glass transition temperature (Tg) and/or melting point (Tm) below the flow temperature required for preservation of heat sensitive substrates, usually between about 160° F. and 300° F.

These unsaturated polyesters typically have a weight average molecular weight (Mw) ranging between about 400 and 10,000, and preferably between about 1,000 and 4,500.

The degree of unsaturation, preferably maleate or fumarate unsaturation, is typically between about 2 and 20 wt. % of the unsaturated polyester resin A), and preferably between about 4 and 10 wt. %.

Furthermore, whether the unsaturated polyester is hydroxyl-functional or acid-functional depends upon the —OH/—COOH molar ratio of the monomer mix. Usually, the hydroxyl-functional resins have a hydroxyl number from about 5 to 100 mg of KOH/gram of resin. The acid-functional resins typically have an acid number from about 1 to 80 mg of KOH/gram of resin.

Free radical initiators B) are employed to generate the free radicals at the active hydrogens and initiate curing (via homopolymerization) of unsaturated polyesters A). Since the surface cure is achieved thermally, the free radical initiators useful herein are selected from traditional thermal initiators, such as peroxides and azo compounds. Examples of suitable peroxide initiators include diacyl peroxides, such as benzoyl peroxide, peroxy esters, peroxy ketals, such as 1,1-bis(t-butylperoxy)-3,3,5-trimethylcyclohexane, peroxy esters, dialkylperoxides, ketone peroxides, etc. Examples of suitable azo initiators include azobis (alkyl nitrile) peroxy compounds, etc. Standard photoinitiators can also be used in conjunction with the thermal initiators for photoactivated (i.e., ultraviolet light) curing.

In general, the amount of free radical initiator B) used in the powder coating composition of the present invention ranges between about 0.1 and 10 phr, and preferably between about 1 and 5 phr.

Preferably, the free radical initiators B) used herein are solids. Of course, if they are liquids, as with any of the other materials employed in the UV curable powder, they can be converted to solids by absorption onto inert filler before use, as is well known in the art. Yet, liquids should be avoided whenever possible.

Redox catalysts C) are also employed in the powder coatings to induce the generation of free radicals from the initiators through a reduction-oxidation reaction. As redox catalysts, transition metal compounds based on a fatty acid or oil may be employed. Examples of suitable metals include cobalt, manganese, lead, copper, and vanadium. Cobalt-containing compounds, especially cobalt salts of monocarboxylic (i.e., fatty) acids, for example, cobalt octoate, cobalt neodecanoate, cobalt naphthenate, and cobalt octadecanoate, are most preferred. During curing, at the surface of the coating, even the free radicals formed at the active hydrogen sites tend to react with atmospheric oxygen to form hydroperoxides (i.e., inactivated peroxide initiators), which halts the curing reaction. Yet, the hydroperoxides so formed, due to their location, are now readily decomposed in the presence of the cobalt salts to re-initiate the free radical cure, thus allowing the cure to proceed to completion at the surface.

The redox catalysts C) are generally employed in the powder coating of this invention in amounts of less than about 1.0 phr, and preferably in the range between about 0.1 and 0.5 phr.

In accordance with this invention, it may be desirable to include co-polymerizable curative resins D) in the powder coating resin system in place of some of the unsaturated polyester resin A). Since the unsaturated polyester resins A) are self-curing (via homopolymerization) due to presence of active hydrogen sites in the polyester molecule, they do not require curatives to achieve desired cure. Yet, it has been found that if oxygen-reactive (i.e., active hydrogen containing) and other curatives D) are used in conjunction with the active hydrogen containing resins A), surface cure can even be further improved.

The oxygen-reactive and other curatives D) useful herein include ethylenically unsaturated resins, and preferably having two sites of unsaturation per molecule. Examples of such curative resins include oligomers or polymers having vinyl ether, vinyl ester, allyl ether, allyl ester, acrylate or methacrylate groups. Examples of suitable allyl esters include the reaction produce of allyl alcohol and phthalic anhydride, such as diallyl phthalates, iso-diallyl phthalates, and p-diallyl phthalates, etc. Examples of suitable allyl ethers include the reaction product of allyl propoxylate and hydrogenated methylene diisocyanate, etc. Examples of suitable vinyl ethers include divinyl ether urethanes, such as those formed by the reaction of hydroxybutyl vinyl ether with diisocyanates. Examples of suitable methacrylates or acrylates include methacrylated or acrylated urethanes, such as those formed by the reaction of hydroxyethyl or hydroxypropyl methacrylate or acrylate with diisocyanates, etc.

The curatives D), like the unsaturated polyesters A), can be formulated to have either a crystalline or amorphous microstructure. This will depend on choice of monomers employed in the formation reaction, as is well known in the art, and desired flow out and final coating properties.

The amount of curative D) relative to the unsaturated polyester resin A) will also depend on the choice of materials employed. Usually, such materials are employed in stoichiometric equivalent amounts to allow crosslinking during curing to proceed to substantial completion, although excess of either can be used when desired. In the present invention, the curatives D), if used, typically comprise up toe about 50 wt. % of the resin, and preferably up to about 20 wt. %.

Common additives can also be employed in the powder coatings of this invention. For instance, powder coatings formed in accordance with this invention may be clear (i.e., unpigmented) or may contain up to about 200 phr, though generally about 120 phr or less, of conventional fillers and/or pigments. Examples of suitable fillers include calcium carbonate, barium sulfate, wollastonite, mica, china clay, diatomaceous earth, benzoic acid, low molecular weight nylon, etc. Examples of suitable pigments include inorganic pigments, such as titanium dioxide, and organic pigments, such as carbon black, etc.

The other common additives, such as gloss control agents, flow control agents, dry flow additives, anticratering agents, texturing agents, light stabilizers, etc., are typically present in a total amount of up to about 15 phr. Examples of suitable gloss control agents include polyethylene waxes, oxidized polyethylenes, polyamides, teflons, polyamides, etc. Examples of suitable flow control agents include acrylic resins, silicone resins, etc. Examples of suitable dry flow additives include fumed silica, alumina oxide, etc. Examples of suitable anticratering agents include benzoin, benzoin derivatives, low molecular weight phenoxy and phthalate plasticizers, etc. Examples of texturing agents include organophilic clays, crosslinked rubber particles, multiple curatives, etc. Examples of suitable light stabilizers include hindered amines, hindered phenols, etc.

The coating powders are produced in the usual manner. The components are dry blended together, and then melt blended in a single screw or twin screw extruder with heating above the melting point of the resin system. The extruded composition is rapidly cooled and broken into chips, ground in a mill with cooling, and, as necessary, the particulates are screened and sorted according to size. Average particle size desired for electrostatic application is typically between about 20–60 microns. Extrusion is preferably carried out at between about 180° F.–250° F., to minimize any curing and gelation from taking place in the extruder. Gaseous or supercritical fluid, such as gaseous or supercritical $CO_2$, may be charged to the extruder to reduce the extrusion temperatures. This is particularly desirable with powders containing crystalline materials.

Once the dry, free flowing, powders are produced, they are ready for application onto a substrate to be coated.

The powder coatings are applied in the usual fashion, e.g., electrostatically, to the substrate. Usually electrostatic spray booths are employed which house banks of corona discharge or triboelectric spray guns and recirculators for recycling over sprayed powders back into the powder feed. They applied powders are next exposed to sufficient heat for the powders to melt, flow out into a continuous film, and cure. The substrate may be heated at the time of application and/or subsequently to effect flow out and cure. Heating is usually performed in infrared, convection ovens, or a combination of both. The powders of this invention are formulated to melt, flow out, and attain full cure, even at the surface, at extraordinarily low temperatures and/or rapid speeds, while still being melt extrudable, thus making them especially suited for heat sensitive substrates without risking thermal damage to the substrate, such as embrittlement, loss of integrity, deformation, and other physical and/or chemical degradation during curing.

The cure temperature of the composition is usually about 300° F. or below, and typically even 250° F. or below, temperatures consistent with application of the coating powder compositions to wood or plastic products. Of course cure is time-dependent as well as temperature dependent; however, a full cure at the above temperatures can be achieved within a reasonable time, for example in about 30 minutes or less. The preferred powder coatings of this invention can effect a full cure at between about 250–300° F. in about 5 minutes or less which is safe for most heat sensitive applications. A "Full cure" is a degree of curing achieved at which additional time at elevated temperature will not improve the properties of the coating once cooled to ambient temperatures.

Example of suitable heat sensitive substrates useful herein include wood, such as hardwood, hard board, laminated bamboo, wood composites, such as particle board, electrically conductive particle board, low, medium or high density fiber board, masonite board, laminated bamboo, and other substrates that contain a significant amount of wood. Any of the wood based substrates may be filled or primed with materials, such as UV liquids, powder primers, or solvent or waterborne coatings to improve smoothness and reduce film builds. Other heat sensitive substrates include plastics, such as ABS, PPO, SMC, polyolefins, polycarbonates, acrylics, nylons and other copolymers which usually will warp or outgas when coated and heated with traditional heat curable powders, along with paper, cardboard, composites and metal components with a heat sensitive aspect, etc. The powder coatings are also applicable to the usual heat resistant substrates, such as metal, steel and other alloys, glass, ceramic, carbon, graphite, etc.

In summary, the present inventors have found that incorporation of a compound containing one or more active hydrogens into the unsaturated polyester resin molecule itself significantly improves the surface cure properties of the cured coating without the need for waxes or oxygen-reactive curatives. While not wishing to be bound by theory, it is believed that inclusion of the active hydrogen containing compound into the unsaturated polyester molecule allows for the generation of free radicals which have greater stability and are less susceptible to permanent deactivation upon contact with atmospheric oxygen. When the free radicals react with oxygen and are capped, they are easily initiated again in the presence of the redox catalysts. Cure of the coating film can therefore now proceed to completion along the surface.

This invention will now be described in greater detail by way of specific examples.

EXAMPLE 1

Preparation of Unsaturated Polyester Resin Containing Active Cyclohexyl Hydrogens 1 mole (144 g) of 1,4-cyclohexane dimethanol was charged into a 0.5 liter resin kettle fitted with a partial condenser, total condenser, stirrer, nitrogen inlet, and temperature controller. While introducing a stream of nitrogen at rate of 25–30 mL/min and stirring, the temperature was raised to 125° C. Thereafter, 0.5 mole (74 g) of phthalic anhydride, 0.6 mole (69.6 g) of fumaric acid, and 50 ppm of 4-methoxy phenol (catalyst) were added to the kettle. Still under agitation and nitrogen sparge, the temperature was slowly raised to 180° C. while the water of esterification was collected. When 85–90% of the theoretical distillate had been collected, vacuum was applied to remove the rest of the water. The resin was then discharged into a pan, cooled and ground into flakes. The amorphous resin recovered had the following characteristics.

| Properties | Example 1 |
| --- | --- |
| Glass Transition Temperature (Tg) | 33.0° C. |
| Melting Point (Tm) | 43.6° C. |
| Acid Number (mg of KOH/g of resin) | 45 |
| ICI viscosity @ 175° C. | 3250 cps |
| Molecular Weight (Mw) | 2,500 |

EXAMPLE 2

Preparation Of Unsaturated Polyester Powder Coating With Active Cyclohexyl Hydrogens The following ingredients were blended together in the given manner and amounts to form powder coatings (A, B).

| | Parts By Weight | |
| --- | --- | --- |
| Ingredients | A | B |
| DRY BLEND IN KNEADER UNTIL HOMOGENEOUS | | |
| Unsaturated Polyester (from Example 1) | 100 | |
| Comparative Unsaturated Polyester[1] | | 100 |
| Lupersol 231 XL (Peroxide Initiator)[2] | 5.0 | 5.0 |
| Cobalt Neodecanoate (Redox Catalyst) | 0.5 | 0.5 |

-continued

| Ingredients | Parts By Weight | |
| --- | --- | --- |
| | A | B |
| Resiflow P-67 (Acrylic Flow Agent)[3] | 1.4 | 1.4 |
| Uraflow B (Anticratering Agent)[4] | 0.8 | 1.0 |
| TiPure R-960 TiO$_2$ (Pigment)[5] | 20 | 20 |
| MELT BLEND IN TWIN SCREW EXTRUDER AT 160–180° F. COOL EXTRUDATE AND BREAK INTO CHIPS CHARGE TO BRINKMANN MILL AND GRIND TO POWDER SCREEN TO –140 MESH | | |

Table Footnotes
[1]The comparative resin is an acid-functional unsaturated polyester similar to the unsaturated polyester prepared in Example 1, but one that does not contain active hydrogen groups in the polyester backbone. Instead, it is based on fumaric acid, phthalic anhydride, and neopentyl glycol in place of 1,4-cyclohexane dimethanol.
[2]Lupersol 231XL is a peroxy ketal thermal free-radical initiator based on 1,1-bis(t-butylperoxy)3,3,5-trimethylcyclohexane, sold by Elf Atochem.
[3]Resiflow P-67 is an acrylic flow control agent, sold by Estron Chemical.
[4]Uraflow B is an benzoin anticratering agent, sold by Estron Chemical.
[5]TiPure R-960 is a white titanium dioxide pigment, sold by DuPont.

The aforesaid powders (A, B) were electrostatically sprayed using a tribogun onto separate ½" medium density fiberboards (MDF) that were preheated under medium intensity quartz infrared (IR) lamps to about 250–270° F. surface temperature before powder application. The coated surfaces were next exposed under quartz IR lamps for about 30–60 seconds (i.e., until the surface temperature of the coating reached 300–320° F.) in an open atmosphere to melt and flow out the powders into a smooth and continuous molten films and thermally activate the free radical-induced cure to harden the films. Performance properties of the individual coating powders (A, B) and the coating films formed therefrom are given below.

| Properties | A | B |
| --- | --- | --- |
| Gel Time at 400° F. (sec) | 7 | 9 |
| Hot Plate Melt Flow at 375° F. (mm) | 45 | 126 |
| MEK Resistance (50 Double Rubs) | No Rub Off | Heavy Rub Off |
| Adhesion | Excellent | Poor |
| Smoothness (Orange Peel) | Slight | Moderate |

The above results demonstrate that comparative powder formulation (B), which did not contain active hydrogens in the unsaturated polyester resin itself, exhibited poorer surface cure properties (i.e., poorer MEK resistance) than powder formulation (A) containing the active hydrogens made in accordance with the present invention.

EXAMPLE 3
Preparation Of Unsaturated Polyester Powder Coating With Active Cyclohexyl Hydrogens The following ingredients in the given amounts were blended together by the same method used in Example 2 to form powder coatings (C, D).

| Ingredients | Parts by Weight | |
| --- | --- | --- |
| | C | D |
| Unsaturated Polyester (from Example 1) | 90 | |
| Aropol 7501 Comparative Unsat. Polyester[1] | | 90 |
| Diallyl Isophthalate (Allyl Ether Curative) | 10 | 10 |

-continued

| Ingredients | Parts by Weight | |
| --- | --- | --- |
| | C | D |
| Lupersol 231XL (Peroxide Initiator) | 6.0 | 5 |
| Cobalt Neodecanoate (Redox Catalyst) | 0.5 | 0.5 |
| Resiflow P-67 (Acrylic Flow Agent) | 2.3 | 2.3 |
| Tipure R-960 TiO$_2$ (Pigment) | 20 | 20 |

Table Footnotes
[1]The comparative Aropol 7501 resin, sold by Ashland Chemical, is an unsaturated polyester resin that is believed to not contain active hydrogen groups in the polyester molecule.

The aforesaid powders (C, D) were electrostatically sprayed and cured onto separate MDF boards by the same method used in Example 2. Performance properties of the coating powders (C, D) and coating films formed therefrom are given below.

| Properties | C | D |
| --- | --- | --- |
| Gel Time at 400° F. (sec) | 5 | 14 |
| Hot Plate Melt Flow at 375° F. (mm) | 15 | 17 |
| MEK Resistance (50 Double Rubs) | No Rub Off | Moderate Rub Off |
| Adhesion | Excellent | Good |
| Smoothness (Orange Peel) | Moderate | Heavy |

The above results demonstrate that comparative powder formulation (D) exhibited poorer surface cure properties (i.e., poorer MEK resistance) than the active hydrogen containing powder formulation (C) made in accordance with the present invention.

EXAMPLE 4

Preparation of Unsaturated Polyester Resin Containing Active Allylic Hydrogens 2 moles (104 g) of neopentyl glycol were reacted with 1 mole (83 g) of isophthalic acid, 0.6 mole (45.6 g) of tetrahydrophthalic anhydride, 0.6 mole (34.8 g) of fumaric acid, in the presence (50 ppm) 4-methoxy phenol, under the same procedure used in Example 1. The amorphous resin recovered had the following characteristics.

| Properties | Example 4 |
| --- | --- |
| Glass Transition Temperature (Tg) | 43.0° C. |
| Melting Point (Tm) | 47° C. |
| Acid Number (mg of KOH/g of resin) | 42 |
| ICI viscosity @ 175° C. | 500 cps |
| Molecular Weight (Mw) | 2,500 |

EXAMPLE 5

Preparation of Unsaturated Polyester Powder Coating With Active Allylic Hydrogens The following ingredients were blended together in the given amounts by the method used in Example 2 to form powder coating (E).

| Ingredients | Parts by Weight E |
| --- | --- |
| Unsaturated Polyester (from Example 4) | 100 |
| Lupersol 231XL (Peroxide Initiator) | 5.0 |
| Cobalt Neodecanoate (Redox Catalyst) | 0.5 |
| Resiflow P-67 (Acrylic Flow Agent) | 1.4 |
| Uraflow B (Anticratering Agent) | 1.0 |
| TiPure R-960 TiO$_2$ (Pigment) | 20 |

The aforesaid powder (E) was sprayed and cured on an MDF board by the method used in Example 2. Performance properties are given below.

| Properties | E |
| --- | --- |
| Gel Time at 400° F. (sec) | 8 |
| Hot Plate Melt Flow at 375° F. (mm) | 105 |
| MEK Resistance (50 Double Rubs) | Slight Rub Off |
| Adhesion | Good |
| Smoothness | Wrinkle |

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A powder coating composition, which is a composition in particulate form that comprises a film-forming blend of:
   a) an unsaturated polyester resin containing an active hydrogen;
   b) a free radical initiator; and,
   c) a redox catalyst.
2. The composition of claim 1, wherein:
said unsaturated polyester resin is derived from at least one ethylenically unsaturated polyfunctional carboxylic acid or anhydride thereof and at least one polyol containing and active hydrogen.
3. The composition of claim 2, wherein:
said at least one active hydrogen containing polyol is selected from polyols containing an allylic, benzylic, cyclohexyl, or tertiary alkyl hydrogen.
4. The composition of claim 2, wherein:
said at least one ethylenically unsaturated polyfunctional carboxylic acid or anhydride thereof is selected from a fumarate, a maleate, or mixture thereof.
5. The composition of claim 2, wherein:
between 10 and 100 mol. % of the hydroxyl functionality relative to the total hydroxyl functionality of polyol monomers used to form the unsaturated polyester resin A) is provided by said at least one active hydrogen containing polyol.
6. The composition of claim 1, wherein:
said catalyst is a redox catalyst comprised of a metal compound based on a fatty acid or oil.
7. The composition of claim 6, wherein:
said redox catalyst is a cobalt salt of a fatty acid.
8. The composition of claim 1, which further comprises:
d) a co-polymerizable ethylenically unsaturated curative resin.
9. The composition of claim 1, wherein:
said composition is free of co-polymerizable ethylenically unsaturated curative resins.
10. The composition of claim 1, wherein:
said free radical initiator is a thermal initiator selected from peroxide or azo compound.
11. A powder coating composition, which is a composition in solid particulate form that comprises a film-forming blend of:
   a) an unsaturated polyester having at least one maleate or fumarate group per molecule and at least one active hydrogen group per molecule;
   b) a thermal peroxide free radical initiator; and,
   c) a redox catalyst selected from a metal compound based on a fatty acid or oil.
12. The composition of claim 11, which further comprises:
   d) a co-polymerizable ethylenically unsaturated curative resin.
13. The composition of claim 11, wherein:
said active hydrogen is selected from an allylic, benzylic, cyclohexyl, tertiary alkyl, or malonyl hydrogen.
14. The composition of claim 11, wherein:
said active hydrogen is derived from a polyol containing an allylic, benzylic, cyclohexyl, or tertiary alkyl hydrogen.
15. The composition of claim 14, wherein:
said active hydrogen containing polyol is selected from trimethylol propane monoallyl ether, trimethyol propane diallyl ether, vinyl cyclohexanediol, benzene dimethanol, cyclohexane dimethanol, cyclohexane diol, methyl propanediol, or butylethyl propanediol.
16. The composition of claim 11, wherein:
said active hydrogen is derived from a polyfunctional carboxylic acid containing an allylic or malonyl hydrogen.
17. The composition of claim 16, wherein:
said active hydrogen containing polycarboxylic acid is selected from malonic acid, nadic anhydride, tetrahydrophthalic anhydride, or dimer acid.

* * * * *